Nov. 22, 1960

J. M. KENDALL

2,961,506

FLUID PRESSURE DIFFERENTIAL SWITCH

Filed July 3, 1947

(K) - COEFFICIENT OF PRESSURE
(X) - DISTANCE FROM NOSE
(L) - LENGTH OF TORPEDO
(X/L) - PERCENT OF LENGTH

Fig. 2.

Inventor
J. M. Kendall
By M. C. Hayes
Attorney

Inventor
J. M. Kendall
By M. C. Hayes
Attorney

Nov. 22, 1960 J. M. KENDALL 2,961,506
FLUID PRESSURE DIFFERENTIAL SWITCH
Filed July 3, 1947 5 Sheets-Sheet 3

Inventor
J. M. Kendall
By M. O. Hayes
Attorney

Nov. 22, 1960  J. M. KENDALL  2,961,506
FLUID PRESSURE DIFFERENTIAL SWITCH
Filed July 3, 1947  5 Sheets-Sheet 4

Inventor
J. M. Kendall
By M. O. Hayes
Attorney

Nov. 22, 1960 J. M. KENDALL 2,961,506
FLUID PRESSURE DIFFERENTIAL SWITCH
Filed July 3, 1947 5 Sheets-Sheet 5

Inventor
J. M. Kendall
By M. O. Hayes
Attorney

United States Patent Office 2,961,506
Patented Nov. 22, 1960

2,961,506
FLUID PRESSURE DIFFERENTIAL SWITCH
James M. Kendall, Coral Hills, Md.
Filed July 3, 1947, Ser. No. 758,969
14 Claims. (Cl. 200—81.5)
(Granted under Title 35, U.S. Code (1952), sec. 266)

This invention relates generally to fluid pressure differential responsive switches and more particularly to a switch of this character which is adapted for use with a marine device and adapted to be actuated in response to a predetermined difference in the dynamic pressure of the surrounding water at two spaced points on the device as the device moves through the water.

Such a switch is particularly well adapted for use in an exploder mechanism for a torpedo such, for example, as the torpedo exploder mechanism disclosed and claimed in the copending application of James M. Kendall and George A. Henderson, Serial No. 780,562, filed October 17, 1947, for Torpedo Exploder Mechanism.

In the copending application, according to one embodiment thereof, a switch of the aforedescribed character is used to initiate operation of a delayed arming device as the switch closes when the torpedo has reached a predetermined speed through the water sufficient to develop the aforesaid predetermined difference in dynamic pressure between the nose and side wall of the torpedo. When operation of the delayed arming device is completed, the firing circuit of the exploder mechanism is rendered effective to fire the torpedo as an inertia switch in the circuit operates in response to the impact of the torpedo with a target vessel. According to another embodiment of the copending application, the switch is also employed to open the firing circuit as the switch opens in response to the reduction in dynamic pressure of the water surrounding the torpedo during a broach of the torpedo, thereby to render the inertia switch ineffective to fire the torpedo as the inertia switch operates in response to the shock of impact of the torpedo when the torpedo falls back on the surface of the water.

Various fluid differential pressure responsive switches have been heretofore devised for actuation in response to the difference in dynamic pressure at spaced points on the outer surface of a torpedo. Such a switch, for example, is disclosed and claimed in the copending application of Ernest R. Haberland for Torpedo Arming Device, Serial No. 573,623, filed January 19, 1945. The prior art switches have not been found to be entirely satisfactory under all conditions of use for the reasons that numerous moving parts have usually been employed which could not conveniently be included as a component part of the exploder mechanism to form a unitary and compact structure adaptable for mounting within a handhole of the torpedo. Moreover, previously designed switches have been found to be erratic in operation in failing to provide means for avoiding the effects of the static pressure of the surrounding water thereon.

An object of the present invention is to provide a new and improved fluid pressure differential responsive switch.

Another object resides in the provision of a new and improved fluid differential pressure responsive switch adapted to be operated in response to a predetermined difference in the dynamic pressure of the surrounding water at two spaced points on a moving torpedo.

Another object is to provide a differential switch for use with marine devices in which the switch is adapted to be actuated in response to a predetermined difference of the dynamic pressure of the surrounding water and in which the effects of the static pressure of the water on the switch are obviated.

Another object is to provide a fluid differential pressure responsive switch which is adapted to be mounted as a part of an exploder mechanism in the handhole of a torpedo and connected in communication with the surrounding water at two spaced points on the outer surface of the torpedo.

A further object is to provide a fluid pressure differential responsive switch which has all of the desired qualities of ruggedness, compactness, effectiveness in operation and simplicity of construction, and which is further characterized by a minimum number of moving parts.

An additional object is to provide a fluid differential pressure switch which may be arranged to effect a plurality of different circuit controlling operations in the circuit associated therewith.

Still other objects, advantages and improvements will be apparent from the following description taken in connection with the accompanying drawings wherein.

Figure 1:
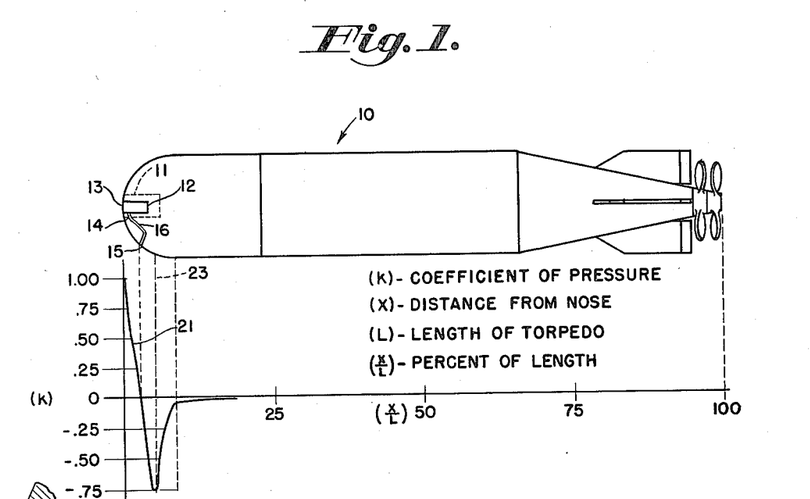
Fig. 1 is a diagrammatic view of a torpedo employing the differential fluid pressure responsive switch of the present invention according to the preferred embodiment thereof and illustrating the variation in dynamic pressure of the surrounding water from the nose of the torpedo backward along the side wall thereof.
Figure 2:
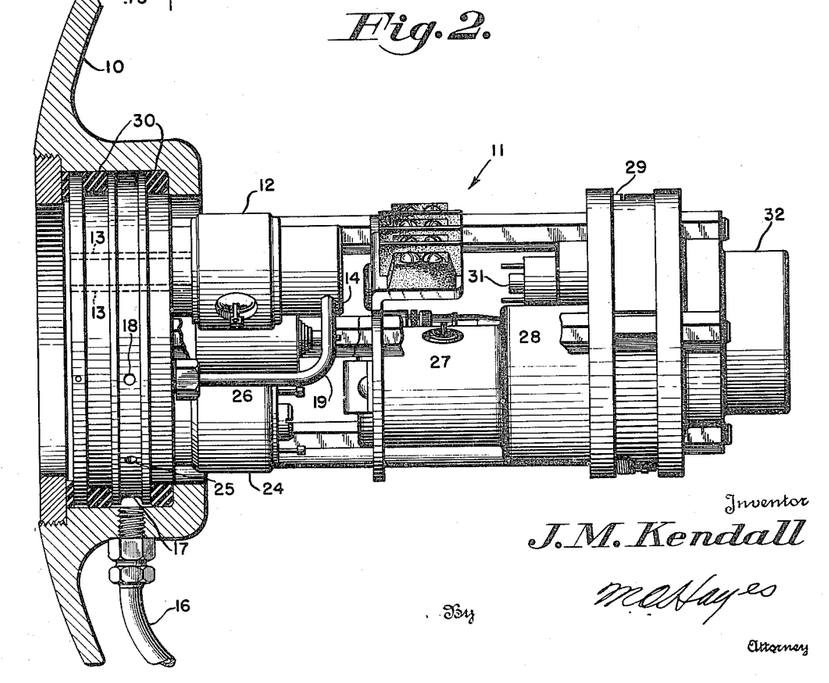
Fig. 2 is a fragmentary sectional view of a torpedo showing a torpedo exploder mechanism mounted within a handhole in the nose of the torpedo and employing the preferred embodiment of the pressure responsive switch.

Referring now to the drawings and more particularly to Figs. 1 and 2 thereof, there is shown thereon a torpedo generally designated 10 and comprising an explorer mechanism 11 which is mounted in a handhole provided in the nose of the torpedo. The exploder mechanism comprises a fluid pressure differential responsive switch 12 which is provided with a pair of high pressure ports 13 and with a low pressure port 14 which is in communication with the surrounding water at port 15 in the side wall of the torpedo by way of conduit 16, annular groove 17 and bore 18 in bottom plate 39 of the exploder mechanism, and thence by way of conduit 19 to the switch port at 14. Switch 12 is adapted to be actuated when a predetermined difference occurs in the fluid pressures applied respectively to the high and low pressure ports thereof, as will appear in greater detail hereinafter. This pressure differential is developed from the difference in dynamic pressure of the surrounding water between the nose and side wall of the torpedo when the switch is employed as a component of the torpedo exploder mechanism.

Referring now to the graphical portion of Fig. 1, wherein the zero dynamic pressure value corresponds to the static pressure of the surrounding water at the depth of submergence of the torpedo therein, it will be seen that the dynamic pressure on the outer surface of the torpedo, as it moves through the water, is a maximum at the nose of the torpedo and decreases rearwardly thereof to zero value at a point on the sidewall of the torpedo at which port 15 is located and at which the dynamic pressure is zero regardless of the speed of the torpedo. For different speeds of the torpedo, dynamic pressure, as a function of the position along the torpedo sidewall, has different values.

Beyond port 15, the dynamic pressure decreases to a maximum negative value at point 23 on the surface of the torpedo and thereafter increases approximately to zero value at the point where the hemispherical nose merges with the cylindrical sidewall, the pressure along the cylindrical sidewall remaining substantially constant at a small negative value.

The pressure at any point along the sidewall of the torpedo starting from the nose in an aft direction may be determined from the equation:

$$P = \rho d + k(\tfrac{1}{2} \rho v^2)$$

where

P is the total pressure at the point.
$\rho d$ is the static pressure at the point.
$k(\tfrac{1}{2} v^2)$ is the dynamic pressure at the point.
$\rho$ is the density of the water in slugs.
$d$ is the depth of submergence of the torpedo.
$v$ is the velocity of the torpedo.
$k$ is the coefficient of dynamic pressure given by the curve of Fig. 1 as a function of position along the sidewall.

The position along the sidewall is conveniently measured in units of $X/L$: where $X/L$ is the percent of length of the torpedo; L is the length; and X is the distance back from the nose of the torpedo.

Exploder mechanism 11 also includes a hydrostatic switch 24 having a water inlet port 25 in communication with the water in annular groove 17, an inertia switch 26, and a motor 27 and gear reduction 28 therefor. The exploder mechanism further comprises an arming switch 29 and motor cutoff switch 31 which are adapted to be actuated by a rotor disk 83, Fig. 8, which, in turn, is driven by the motor through the gear reduction therefor, all in the manner and for the purposes hereinafter more fully to appear. The rotor also moves a detonating element 152, Fig. 8, into operative firing relation with respect to an explosive train comprising the booster charge 32 and with respect to an electro responsive squib 60, Fig. 8, adapted to be detonated under control of the inertia switch 26 as the inertia switch is operated in response to the impact of the torpedo with a target vessel.

Figure 3:
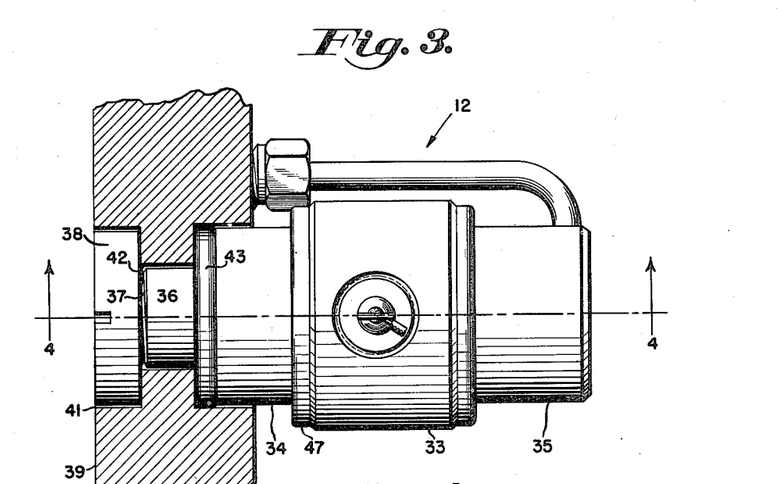
Fig. 3 is a view in elevation of the preferred embodiment of fluid differential pressure responsive switch.
Figure 4:
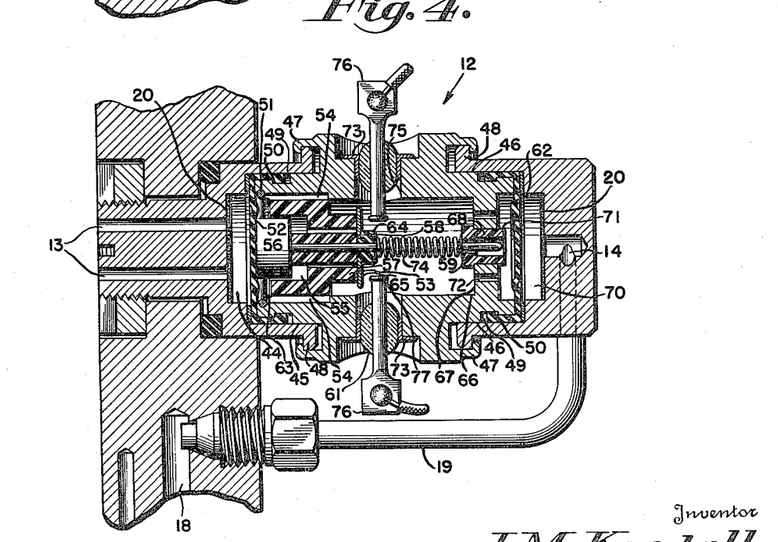
Fig. 4 is a sectional view of the differential switch taken along the line 4—4 of Fig. 3 and illustrating the manner of mounting the switch in the exploder mechanism.

Referring now to Figs. 3 and 4, it will be seen that the differential fluid pressure responsive switch 12 comprises a cylindrical housing 33 substantially of tubular configuration and reduced cylindrical portions 34 and 35, cylindrical portion 34 having a cylindrical projection 36 extending axially thereof. Projection 36 has a threaded portion 37 in matching engagement with a locking ring 38 for securing the switch to the bottom plate 39 of the exploder mechanism. The bottom plate is provided with cylindrical recess 41 for receiving the locking ring 38 and an axial bore 42 for receiving the shank 36, a flexible gasket 43 being interposed between the bottom plate and reduced portion 34 of the switch to form a watertight seal therebetween.

A pair of cylindrical portions 45 and 46 of the housing 33 are fitted within bores in the cylindrical portions 34 and 35 respectively and are secured therein by crimping the flanged ends 47 of the housing 33 about the corresponding annular flanges 48 of the cylindrical portions 34 and 35, as shown. The ends of portions 45 and 46 are each formed to receive the inturned flange 50 of the flexible diaphragms 52 and 62, respectively, each of which forms a water-tight seal between the housing 33 and the respective cylindrical portions 34 and 35 individual thereof. Diaphragms 52 and 62 are each formed with lip 50 adapted to be received respectively within grooves 49 formed therefor within portions 45 and 46.

A pair of axially disposed chambers 44 and 70 are formed between the diaphragms and the corresponding end walls within portions 34 and 35 which chambers are in communication with high pressure port 13 and low pressure port 14 respectively.

A pair of circular screens 20 are fitted within chambers 44 and 70 to exclude foreign matter from entering the switch 12.

Piston guide 53, preferably formed of phenolic material, is inserted within the bore of cylindrical portion 33 and is provided with longitudinal grooves 54, an axial bore 55 for receiving the piston head 56 slideably therein and a reduced bore 57 for receiving sleeve 58 freely therethrough. Snap ring 51 disposed between diaphragm 52 and piston guide 53 retains the latter against axial movement with housing 33.

Piston rod 59 is employed to secure piston head 56, sleeve 58 and a bushing 64 in the position shown, these parts being pressed on the rod with an electroconducting disc 65 assembled on bushing 64 and loosely retained between sleeve 58 and bushing 64.

Housing 33 is provided with an inturned flange 67 which forms a centrally disposed opening 68 for receiving bushing 71 therein, the bushing in turn slideably receiving the piston rod 59. Flange 67 has a pair of longitudinal bores 72 therethrough.

Compression spring 74, sleeved about rod 59, is interposed between bushings 71 and 64 and yieldably urges disk 65 into engagement with piston guide 53.

Housing 33 has a pair of diametrically disposed openings 75 into which are inserted a pair of Kovar seals, each comprising a terminal 76 which is insulated from a mounting bushing 73 therefor by a quantity of glass 61 interposed therebetween.

A pair of contacts 77 are secured respectively to the terminals 76 and are adapted to be engaged and electrically connected by contact disk 65 when the piston assembly is moved away from piston guide 53 against the opposing force of spring 74.

At the time of assembly, the switch is filled with a suitable fluid such, for example, as 35 "centistoke" oil, and in a manner which renders the fluid free of air bubbles and air pockets whereby a force applied externally to one of diaphragms 52 and 62 is applied to the other of the diaphragms by way of the fluid, thereby to apply the static pressure of the surrounding water to both sides of the diaphragms. Balancing of the static pressure in this manner avoids erratic operation of the switch which otherwise might result from stressing of the diaphragms and piston rod under the static pressure which is usually considerably greater than the dynamic pressure for operating the switch. The fluid in the switch chamber 66 communicates by way of grooves 54 with the fluid in chamber 63 adjacent diaphragm 52 and by way of bores 72 with chamber 70 adjacent diaphragm 62. Thus, when a predetermined difference in fluid pressure, controlled by the initial compression and spring rate of spring 74 is applied to the diaphragms, the piston assembly is moved against the opposing force of spring 74 to move away from piston guide 53 and into engagement with contacts 77.

Figure 5:
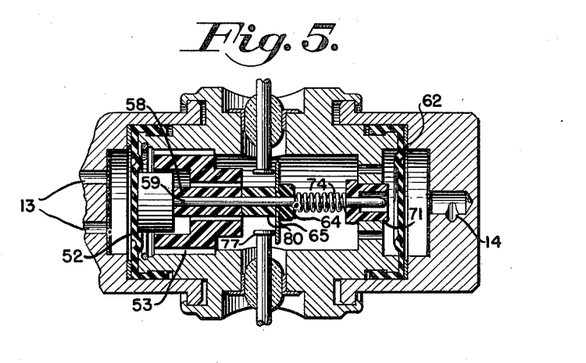
Fig. 5 is a fragmentary sectional view of an alternate contact arrangement for the switch of Fig. 3 wherein a pair of initially closed contacts are employed.

Fig. 5 illustrates an alternate contact arrangement for the switch of Figs. 3 and 4, wherein contact disk 65 and bushing support 64 therefor are spaced from sleeve 58 by a sleeve 80 whereby the disk is disposed on the opposite side of contacts 77 and initially moved into engagement therewith under power of spring 74. Accordingly, in this arrangement, the switch is opened when a predetermined difference in fluid pressure is applied to diaphragms 52 and 62 with the greater pressure being applied to diaphragm 52.

Figure 6:
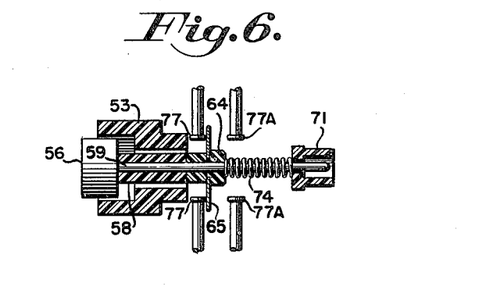
Fig. 6 is a fragmentary sectional view of an alternate contact arrangement for the switch of Fig. 3 wherein a pair of initially closed contacts and a pair of initially opened contacts are employed.

Fig. 6 illustrates a further alternate arrangement of the contacts wherein contacts 77 are initially closed by disk 65 and are adapted to be disengaged therefrom and moved into engagement with another pair of contacts 77A when a predetermined difference in fluid pressure is applied to the diaphragms through high pressure ports 13 and the low pressure port 14, the greater pressure again being applied to diaphragm 52. It will be understood that the differential switch 12 may be constructed in any suitable manner such that the contacts 77A may be arranged in the same longitudinal plane as contacts 77 or in any plane spaced angularly therefrom.

Figure 7:
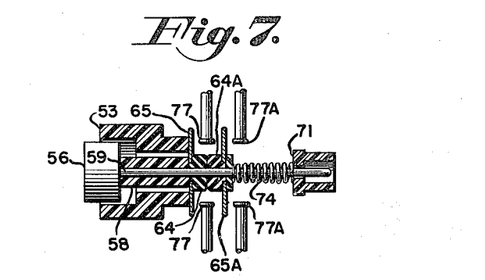
Fig. 7 is a fragmentary sectional view of still another alternate contact arrangement for the switch of Fig. 3 wherein two pairs of initially open contacts are employed.

Still another alternate arrangement of the switch contacts is illustrated in Fig. 7 wherein two pairs of initially open contacts 77 and 77A are employed. In this arrangement, an additional contact disk 65A and bushing support 64A therefor are mounted on rod 59 in opposed relation to disk 65 and bushing 64 thereon. Contacts 77 and 77A are adapted to be bridged by contact disks 65 and 65A respectively when a predetermined difference in pressure is applied to the diaphragms, the greater pressure being applied to diaphragm 52.

Figure 8:
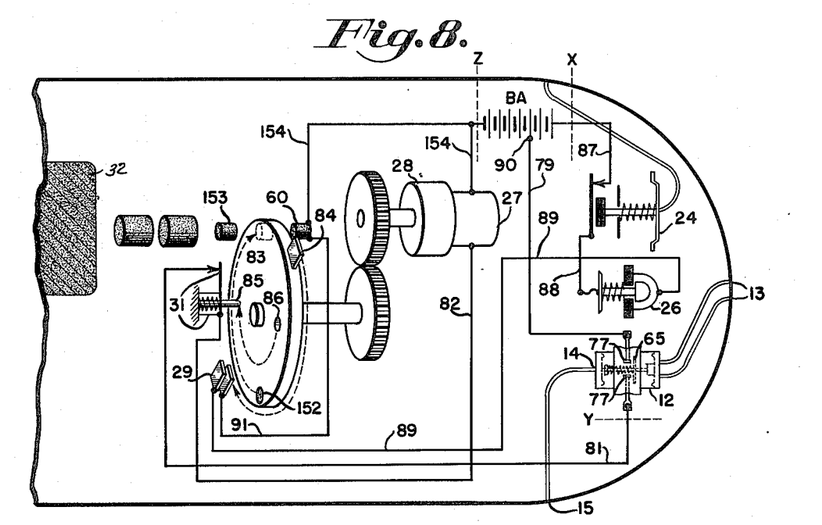
Fig. 8 is a diagrammatic view of the complete electrical system for the exploder mechanism of Fig. 2.

The operation of the exploder mechanism of Fig. 2 in a "homing" torpedo will best be understood by reference to Fig. 8 wherein the complete electrical system of the exploder mechanism is disclosed diagrammatically. A "homing" torpedo is known in the art of marine warfare as one which is provided with a pickup device responsive to some characteristic of the target vessel, such as a microphone responsive to the vibrations of the propellers of the target vessel and which employs means controlled by the pickup device for steering the torpedo to the target vessel.

When the torpedo has been released from a submerged submarine and attains a predetermined speed through the water such, for example, as 9 knots, the difference in the dynamic pressure of the surrounding water on ports 13 and 14 causes disk 65 to move into engagement with terminals 77 to complete an arming circuit from battery BA for energizing motor 27, this circuit being traced from center tap 90 of battery BA through conductor 79, contacts 77 and disk 65 of differential pressure switch 12, conductor 81, initially closed motor cutoff switch 31, conductor 82, motor 27, conductor 154, and thence to the negative side of battery BA.

The motor operates to drive reduction gearing 28 to cause rotor 83 to rotate slowly in the direction indicated by the arrows. After a predetermined lapse of time, the rotor 83 moves contact 84 into engagement with the arming switch 29, and simultaneously therewith, rod 85 secured to the armature of cut-off switch 31 and drops into recess 86 in the rotor, thereby to lock rotor 83 against further rotation and to open cut-off switch 31. As switch 31 opens, the aforetraced circuit energizing the motor is opened to discontinue further operation of the motor.

As the terminals of the arming switch are bridged by contact 84, the inertia switch 26 is connected to the electroresponsive detonator 60, thereby to electrically arm the firing circuit of the exploder mechanism. Concurrently with the closing of the arming switch and operation of the motor cut-off switch, an explosive element 152 moves into alignment with detonator 60 and a tetryl lead 153, thereby to complete an explosive train to the main charge of the torpedo.

A normally closed hydrostatic switch 24 is interposed in the firing circuit and adapted to be opened to render the circuit ineffective to fire the detonator in response to operation of inertia switch 26 when the torpedo has submerged beyond a predetermined depth such, for example, as 30 feet, thereby to protect the submarine which launches the torpedo.

When the torpedo strikes a target vessel, the inertia switch 26 is closed thereby to complete the firing circuit to the detonator from positive terminal of battery BA by way of conductor 87, contacts of switch 24, conductor 88, inertia switch 26, conductor 89, arming switch 29, conductor 91, detonator 60, and thence by way of conductor 154 to the negative side of battery BA. As the firing circuit is completed, the detonator is fired and the main charge of the torpedo, in turn, is exploded.

Figure 9:
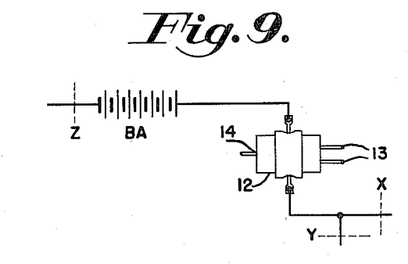
Fig. 9 is a diagrammatic view of a fragmentary circuit arrangement for modifying the circuit arrangement of Fig. 8.

In the modified circuit arranged, obtained by inserting the fragmentary circuit of Fig. 9 into the circuit between the points X—Y—Z of Fig. 8 in place of the circuit elements connected between the points X—Y—Z therein, differential switch 12, is connected in the firing circuit as well as in the circuit for energizing motor 27. In this arrangement, the differential switch serves to open the firing circuit when the torpedo is in broach, thereby to render the exploder mechanism ineffective to fire the torpedo as the inertia switch operates upon impact of the torpedo with the surface of the water following the broach.

Figure 10:
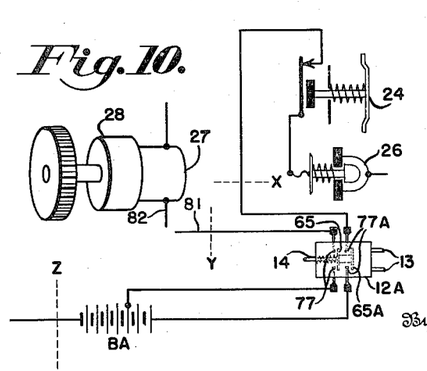
Fig. 10 is a fragmentary portion of a schematic wiring diagram illustrating the manner in which the contact arrangement of Fig. 7 may be employed to apply battery potential to motor M and the floor switch as the torpedo gets under way and to open the firing circuit during a broach of the torpedo.

In the modified circuit obtained by inserting the fragmentary circuit of Fig. 10 into the circuit of Fig. 8 in place of the elements at points X—Y—Z therein, the advantages obtained from the modification of Fig. 8 by the substitution therein of the circuit of Fig. 9 may be obtained with the further advantage of providing separate motor energizing and firing circuits and thus making possible the use of lower voltage for the motor, as in Fig. 8, unmodified. This is accomplished by using the contact arrangement of Fig. 7 in the differential switch 12A.

Figure 11:
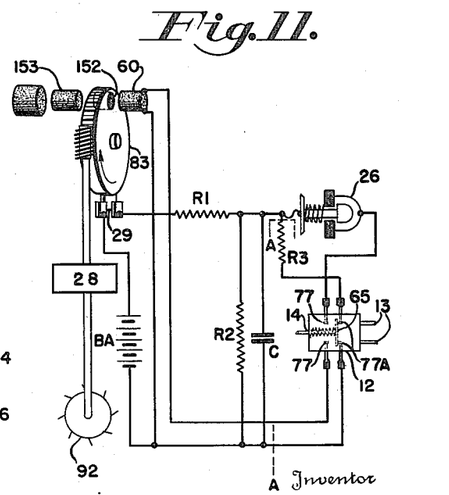
Fig. 11 is a diagrammatic view of a complete electrical system of an alternate form of torpedo exploder mechanism employing a differential pressure responsive switch having the contact arrangement disclosed in Fig. 6.

Fig. 11 illustrates schematically a complete electrical system for a different exploder mechanism wherein a differential pressure switch similar to the embodiment disclosed in Fig. 6 is employed in the firing circuit of the exploder mechanism.

This exploder mechanism employs an impeller wheel 92 in communication with the water surrounding the torpedo and which is adapted to rotate as the torpedo is driven through the water. The impeller wheel is connected through reduction gearing 28 to rotor 83 which after a predetermined number of revolutions of the impeller wheel simultaneously moves contact 84 of arming switch 29 into engagement with the fixed contacts thereof and positions the explosive element 152 in firing relation with respect to the electroresponsive squib 60 and the tetryl lead 153. As arming switch 29 is closed, condenser C is charged from battery BA through resistor R1, resistor R2 being employed to maintain the condenser discharged when the arming switch is open.

The differential pressure switch in this embodiment closes contacts 77A to operatively connect the detonator 60 between the inertia switch 26 and condenser C when a predetermined differential pressure is developed on the switch from the difference in dynamic pressure acting on the nose and sidewall of the torpedo whereby condenser C is discharged through the detonator when the inertia switch 26 is closed in response to the impact of the torpedo with the target vessel.

The differential switch also closes initially open contacts 77 to discharge condenser C below firing potential of detonator 60 when the torpedo is in broach, in which case the dynamic pressure at ports 13 and 14 is reduced to zero and contacts 77 close whereupon contacts 77A open to open the firing circuit and further protect the exploder mechanism against operation during broach.

During the interval the torpedo is on a broach and for a short interval thereafter controlled by the time constant R1C, the exploder mechanism is rendered ineffective to fire the torpedo as the inertia switch operates upon impact of the torpedo with the surface of the water following the broach. This exploder mechanism is generally similar to the mechanism disclosed and claimed in the copending application of James M. Kendall and Charles F. Holdrege, Serial No. 750,615, filed May 26, 1947, for Torpedo Exploder Mechanism, and reference may be had thereto for further details of construction and operation. In the firing circuit disclosed in this copending application, contacts 77A of the inertia switch disclosed in Fig. 11 are not employed, broach protection being afforded by contacts 77 only which close to short circuit the detonator when the torpedo is in broach. It will be understood that, when desired, that portion of the circuit of Fig. 11 including contacts 77 of the differential switch and lying between the points A—A in the circuit may be eliminated and broach protection afforded by opening of the firing circuit only as contacts 77A open upon broach of the torpedo.

Figure 12:
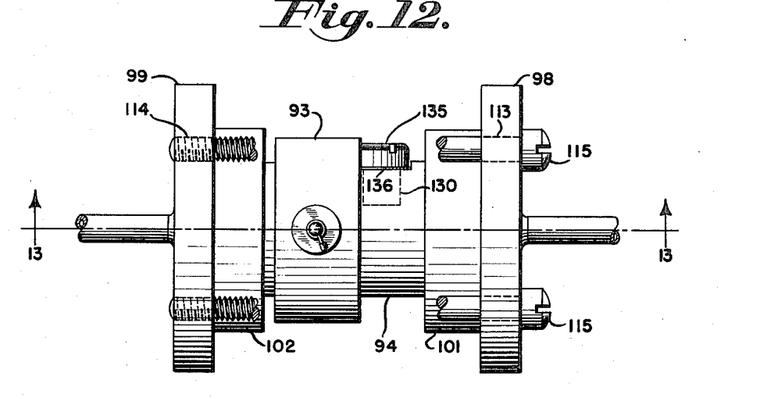
Fig. 12 is a view in elevation of the differential pressure responsive switch according to another embodiment of the invention.
Figure 13:
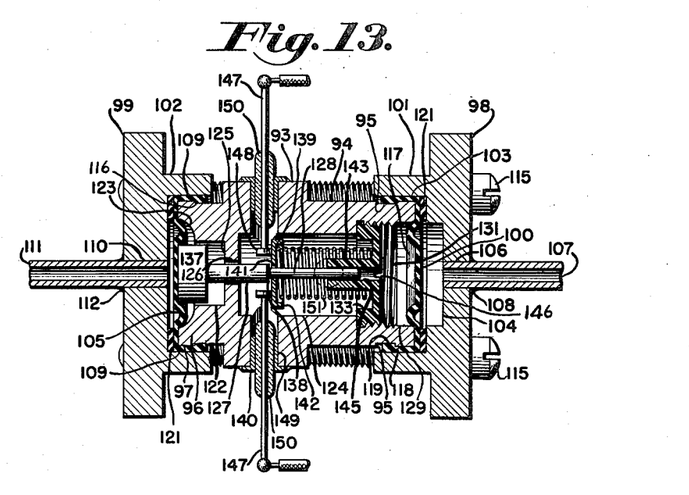
Fig. 13 is a sectional view taken along the line 13—13 of Fig. 12.

Referring now to Figs. 12 and 13, there is shown in detail a fluid pressure actuated differential switch similar to the one disclosed in Fig. 5 wherein the switch contacts are initially closed and are adapted to be disconnected when a predetermined difference in pressure is applied to conduits 111 and 107. The switch is formed of a generally tubular body 93 having a reduced end portion 94, a circumferential groove 95 being formed around this portion of the body adjacent its end, and an opposite end portion 96 which terminates in an annular flange 97. The body 93 is closed by two end plates 98 and 99, having inwardly extending hubs 101 and 102 respectively. The end plate 98 has an axially disposed bore 103, extending within its hub 101, and a counter bore 104 which forms a clearance opening for the flexure of flexible diaphragm 105, as will be later described. End plate 98 has an axial hole 106 therethrough for receiving conduit 107 which is secured therein by a fillet 108 of silver solder. End plate 99 has an axially disposed bore 109 extending within its hub 102. End plate 99 has an axial hole 110 therethrough for receiving conduit 111 which is secured therein by a fillet 112 of silver solder. End plate 98 has holes 113 aligned with threaded openings 114 in end plate 99 for reception of screws 115 for holding end plate 98 and 99 to the body 93.

Flexible diaphragms 105 and 100, of rubber or other suitable flexible material, are secured over end portions 94 and 96, respectively, of the body 93. Each of the diaphragms 105 and 100 is provided with an annular ridge portion 117 therein for increasing the flexibility thereof, and a cylindrical skirt 118 having an inturned flange 119 formed at the bottom of the skirt. These flanges of diaphragms 100 and 105 are fitted respectively within groove 95 of end portion 94 and groove 116 of end portion 96. A pair of annular gaskets 121 formed of cork-"neoprene," or other suitable gasket material, are positioned between diaphragms 100 and 105 and the bottom of recesses 103 and 109 respectively.

Body 93 is provided with an axial bore 122 which terminates at one end thereof in an arcuate recess 123 for providing clearance for ridge portion 117 of diaphragm 105, and at the other end thereof in a reduced bore 126 through which the enlarged portion 127 of a piston rod 128 is slideably supported. Bore 122 forms a cylinder for receiving a piston head hereinafter to be described. Reduced bore 126 communicates with an enlarged axial bore 124 which, together with bore 122 forms an inturned flange 125 therebetween.

Body 93 is also provided with an axial bore 129 which forms a chamber for the inward flexure of diaphragm 100 and terminates in an internally threaded portion 131 in matching engagement with the threaded portion of a spring retainer 133.

Body 93 is further provided with an opening 130 radially extending therethrough to provide for entirely filling the interior of the switch at assembly with any suitable fluid such as 35 centistoke oil, or the like. Oil hole 130 is sealed by screw plug 135 in threaded engagement with body 93 with gasket 136 interposed between the head of plug 135 and body 93.

A piston head 137 in abutment with diaphragm 105 extends from enlarged portion 127 of piston rod 128 and has limited reciprocation within bore 122 as the diaphragm is flexed. The juncture of enlarged portion 127 and piston rod 128 forms a shoulder 138. A contact disk 139 with peripheral rim 142 thereon and preferably formed of brass and silver plated, is provided with an axial hole 141 therethrough to slideably receive piston rod 128 therein, the shoulder 138 forming an abutment for the disk 139.

Spring retainer 133 is provided with an elongated hub 143 having an axial bore 145 which slideably receives piston rod 128 therein. A diametrical slot 146, adapted to receive a screw driver, is formed in the outer face of the spring retainer 133.

The body 93 has a pair of diametrically disposed holes 149 into which are inserted a pair of Kovar seals, each comprising a terminal 147 which is insulated from a mounting bushing 140 therefor by a quantity of glass 150 interposed therebetween.

A pair of contacts 148, preferably of silver, are secured respectively to the terminals 147 and are adapted to be yieldably engaged and electrically connected by disk 139 by the bias of compression spring 151 which is sleeved about piston rod 128 and interposed between disk 139 and spring retainer 133, hub 143 of the spring retainer serving to position the spring thereon.

When a pressure is applied through conduit 111 and a relatively lower pressure is applied through conduit 107 such that a predetermined pressure difference is applied therebetween, diaphragm 105 is caused to flex inwardly and diaphragm 100 is caused to flex outwardly to move piston 137 and thereby cause disk 139 to move out of engagement with contacts 148. The greater pressure acting on diaphragm 105 is applied through the fluid within the switch to diaphragm 100 whereby the latter diaphragm is caused to flex outwardly against the lesser opposing pressure applied externally thereto. To this end, the fluid within the switch must be free of air pockets and bubbles in order that the flexing of the diaphragms will be proportional to the difference in pressure applied thereto.

From the foregoing it will now readily be understood that hydrostatic differential pressure actuated switches have been provided which are well adapted to fulfill the aforesaid objects of the invention and whereas several structural embodiments have been disclosed, it will be apparent to those skilled in the art that additional embodiments and modifications thereof may be made without departing from the spirit and scope of the invention as defined by the appended claims.

The invention herein described may be manufactured and used by or for the Government of the United States of America for governmental purposes without the payment of any royalties thereon or therefor.

What is claimed as new and desired to be secured by Letters Patent of the United States is:

1. In a differential pressure actuated switch of the character disclosed, the combination of enclosing means including a pair of flexible pressure responsive members, a pair of electroconducting terminals extended within said enclosing means in sealed relation with respect thereto, a movable electroconducting element disposed within said enclosing means and adapted to bridge said terminals when moved into engagement therewith, means for yieldably urging said element into a first circuit controlling position with respect to said terminals, means associated with one of said members and said element for causing the element to be moved against the opposing force of said urging means and into a second circuit controlling position with respect to said terminals when said one of the members is flexed inwardly of said enclosing means a predetermined amount, and means including a quantity of fluid which completely fills the enclosing means for causing the element to be moved from said first to said second circuit controlling positions in response to a predetermined difference in pressure applied to said members externally thereof from a source of fluid in continuous communication therewith and in a direction opposing said urging means.

2. In a differential pressure actuated switch of the character disclosed, the combination of enclosing means including a pair of flexible pressure responsive members, a pair of electroconducting terminals extended within said enclosing means in sealed relation with respect thereto, a movable electroconducting element disposed within said enclosing means and adapted to bridge said terminals when moved into engagement therewith, means for yieldably urging said element into a first circuit controlling position with respect to said terminals, means associated with one of said members and said element for causing the element to be moved against the opposing force of said urging means and into a second circuit controlling position with respect to said terminals when said one of the members is flexed inwardly of said enclosing means a predetermined amount, and means including a quantity of fluid which completely fills the enclosing means for rendering the switch insensitive to equal fluid pressures continuously applied externally to said member respectively from a source of fluid and for causing the element to be moved from said first to said second circuit controlling position in response to a predetermined difference in pressure applied to the diaphragms from said source and in a direction to flex said one of the diaphragms inwardly.

3. In a fluid pressure differential responsive switch of the character disclosed, the combination of a pair of electroconducting terminals, movable conductor means for electrically connecting said terminals together, fluid filled means including a pair of spaced pressure responsive elements in hydraulic communication with two spaced points in a surrounding body of fluid, said terminals and movable means being mounted within said fluid filled means and between said pressure responsive elements, means for yieldably urging the movable means into engagement with the terminals when the differential pressure between the spaced points attains a predetermined value, retaining means rigidly mounted within said fluid filled means for seating said yieldable urging means, said yieldable urging means being mounted within the fluid filled means and between said movable means and said retaining means, and means operatively connecting one of said elements with said movable means for causing movement thereof sufficient to disconnect said movable means from said terminals when a predetermined difference in pressure is applied to said elements in a direction opposing said urging means in response to a predetermined difference in dynamic pressure at said points.

4. In a differential pressure actuated switch of the character disclosed, the combination of a cylindrical housing, means including a pair of flexible pressure responsive diaphragms respectively mounted over each end of said housing to thereby enclose a quantity of fluid in said housing whereby inward movement of one diaphragm produces a corresponding outward movement of the other diaphragm and the switch is rendered capable of withstanding relatively great equal pressures respectively applied externally to the diaphragms, a pair of spaced contacts disposed within said housing, piston means operatively connected to one of said diaphragms and axially and slidably mounted within said housing, a movable electroconducting element and resilient means operatively connecting said electroconducting element to said piston means to thereby yieldably connect said contacts together electrically by way of said electroconducting element when a first predetermined difference is applied to said diaphragms externally thereof and to disconnect said contacts when a second predetermined difference in pressure is applied to said diaphragms externally thereof with the greater pressure applied to said one of the diaphragms.

5. In a differential fluid pressure actuated switch for use with marine devices, the combination of a housing forming a fluid filled chamber therein and having a pair of flexible faces in communication with the surrounding water at two spaced points therein, a pair of electroconducing terminals mounted upon the walls of said housing and extending into said chamber through the walls of said housing and in electrically insulated and fluid tight relation with respect to said housing, releasable means within said chamber for electrically connecting said terminals together, and means including a movable piston element operatively secured at one end thereof to the inner surface of one of said flexible faces and disposed within said chamber in force transmitting relation with respect to said releasable means and to the other one of said faces of the housing for moving the releasable means into a predetermined circuit controlling position with respect to said terminals in response to a predetermined difference in pressure applied to said faces from the surrounding water.

6. In a differential fluid pressure actuated switch for use with a movable marine device, the combination of a housing forming a fluid filled chamber therein and having a pair of flexible faces, means individual to said faces for bringing the surrounding water into communication therewith from two spaced points on the outer surface of said marine device, a pair of electroconducting terminals mounted upon the walls of said housing and extending into said chamber through the walls of said housing and in electrically insulated and fluid tight relation with respect to said housing, releasable means within the chamber for electrically connecting said terminals together, means including a movable piston element operatively secured at one end thereof to the inner surface of one of said flexible faces and disposed within said chamber in force transmitting relation with respect to said releasable means and to the other one of said faces of the housing for moving the releasable means into a first predetermined circuit controlling position with respect to said terminals when said one of the faces is moved inwardly of the chamber in response to a first predetermined difference in pressure applied to said faces from the surrounding water as a corresponding difference in dynamic pressure is developed at said spaced points in response to movement of the marine device through the water, and resilient means mounted within the chamber and operatively connecting said releasable means to said piston element for movement therewith and for yieldably urging the releasable means to a second predetermined circuit controlling position with respect to the terminals when a second predetermined difference in pressure is applied to the faces.

7. A differential fluid pressure actuated switch of the character disclosed comprising, in combination, means defining a chamber and comprising a rigid tubular wall and end walls, a pair of terminals extending diametrically into said tubular wall, means for securing said terminals to the tubular wall in electrically insulated and fluid sealed relation therewith, a pair of flexible members interposed respectively between said end walls and said terminals and forming a sealed inner chamber within said first named chamber, a contact member within said inner chamber, means intermediate the contact member and one of said flexible members for yieldably urging said contact member into engagement with said terminals, a piston interposed between the other one of said flexible members and said contact member, a duct in the end wall adjacent said one of the flexible members for admitting fluid under pressure from a first source thereto, a duct in the end wall adjacent said other one of the flexible members for admitting fluid under pressure from a second source thereto, and a quantity of fluid completely filling said inner chamber for preventing inward flexing of said members in response to equal pressures respectively applied thereto from said fluid sources and for causing said piston to be moved to disengage said contact member from said terminals when the pressure of the fluid from said second source exceeds by a predetermined value the pressure of the fluid from said first source.

8. A differential pressure actuated switch of the character disclosed comprising a housing of generally tubular configuration and having flexible end walls, a pair of terminals extended into the housing in electrically insulated and fluid tight relation therewith, a movable contact member in the housing adapted to be moved into engagement with said terminals thereby to connect them electrically, means intermediate said contact member and one of said end walls for yieldably urging the contact member into a first circuit controlling position with respect to said terminals, a piston member interposed between the other one of said end walls and the contact member for imparting inward flexing movement of said other one of the end walls to the contact member, a quantity of fluid filled in said housing in such a manner as to exclude all air bubbles and air pockets therefrom whereby a predetermined difference in fluid pressure applied externally to said end walls from a fluid source with the greater pressure applied to said other one of the end walls causes the contact member to be moved to a second circuit controlling position with respect to said terminals, and means individual to said end walls for continuously applying fluid under pressure from said source.

9. In a fluid differential dynamic pressure actuated switch for a torpedo, the combination of a fluid filled cylindrical casing carried by said torpedo and including first and second flexible members mounted in sealed relation at the ends of the casing, means for respectively enclosing said first and second flexible members and having ports in communication with the surrounding water at the nose and side wall of the torpedo for admitting water under pressure to the outer surface of said members, a pair of spaced terminals extending through the walls of said casing in electrically insulated and fluid tight relation with respect thereto, means including a piston element mounted within said casing in operative connection with said first member for causing the element to be moved axially within said casing as said members are flexed in response to a difference in pressure applied thereto through said ports, a contact carried by said piston element and positioned thereby in a first circuit controlling position with respect to said terminals when equal pressures are applied respectively to said members through said ports, and resilient means mounted within the casing and operatively connected to said contact for yieldably urging the contact toward said first circuit controlling position, said contact being adapted to be moved to a second circuit controlling position with respect to said terminals when the difference in the dynamic pressure of the surrounding water between the nose and side wall of the torpedo has reached a predetermined value.

10. In a differential fluid pressure actuated switch of the character disclosed, the combination of a cylindrical casing, enclosing means including a pair of flexible diaphragms for enclosing a quantity of fluid in sealed relation within said casing in such a manner that inward movement of one diaphragm causes a corresponding outward movement of the other diaphragm, said enclosing means having ports individual thereto for admitting fluid under pressure to the outer surfaces of said diaphragms from a source of fluid, a pair of spaced terminals extending through the walls of said casing and into the fluid within said casing in fluid tight and electrically insulated relation with respect to said casing, and a movable circuit controlling means disposed within the fluid in force transmitting relation with respect to one of said diaphragms, and resilient means mounted within said casing and connected to said circuit controlling means for yieldably urging the circuit controlling means in a first circuit controlling position with respect to said terminals when equal pressures are applied to the diaphragms from said source, said circuit controlling means being slidably mounted within the casing for movement to a second circuit controlling position with respect to said terminals in response to a predetermined difference in pressure applied to the diaphragms from said source with the greater pressure being applied to said one of the diaphragms.

11. In a differential fluid pressure actuated switch of the character disclosed, the combination of a casing, enclosing means including a pair of flexible diaphragms for enclosing a chamber within said casing, means for respectively securing the diaphragms to the casing in fluid sealed relation therewith, said enclosing means having ports therein individual thereto for continuously applying fluid under pressure to the outer surfaces of said diaphragms from a fluid source in motion with respect to the switch, a quantity of fluid completely filling said chamber whereby inward movement of one diaphragm produces a corresponding outward movement of the other diaphragm and the static pressure on the diaphragms of the fluid from said source is ineffective to move the diaphragms, a pair of spaced terminals extending within said casing in watertight and electrically insulated relation with respect thereto, and a spring biased circuit controlling means associated with one of said diaphragms in movement imparting relation with respect thereto and normally positioned by the spring bias thereon into a first circuit controlling position with respect to said terminals and adapted to be moved within said casing against the opposing force of said spring bias to a second circuit controlling position with respect to said terminals when a predetermined difference in pressure derived from a corresponding difference in dynamic pressure at two spaced points in said source is applied to said diaphragms with the greater pressure applied to said one of the diaphragms.

12. In a differential fluid pressure actuated switch for use with a marine device, the combination of means forming a fluid filled cylinder and comprising a pair of flexible diaphragms for closing the ends of said cylinder in fluid tight relation with respect thereto whereby the static pressure of the surrounding water applied externally to said diaphragms respectively from two spaced points on the outer surface of said marine device is ineffective to move the diaphragms and inward flexing movement of one of said diaphragms produces a corresponding outward movement of the other one of the diaphragms in response to a difference in the dynamic pressure of the surrounding water developed at said points in response to relative motion between the marine device and the water, means individual to said diaphragms for applying the pressure of the surrounding water at said spaced points thereto, an element disposed within said cylinder, means for yieldably urging said element into abutting relation with respect to said one of the diaphragms whereby the element is adapted to be moved axially within said cylinder in response to the movement of said diaphragms, a pair of terminals extending radially into said cylinder in electrically insulated and fluid tight relation with respect thereto, and a circuit controlling means carried by said element and initially positioned thereby in a first circuit controlling position with respect to said terminals and adapted to be moved to a second circuit controlling position with respect thereto when the difference in dynamic pressure developed at said spaced points has reached a predetermined value.

13. In a fluid differential dynamic pressure responsive switch for use in a torpedo exploder mechanism, the combination of first and second flexible diaphragms, means including said diaphragms and a casing for completely enclosing a quantity of fluid therebetween, means individual to said first and second diaphragms for respectively applying thereto the pressure of the surrounding water at the nose and side wall of the torpedo, a plurality of spaced terminals mounted on said enclosing means and extended from the exterior of said casing into said fluid therein, movable contact means slidably mounted within said fluid and having one end thereof operatively connected to said first diaphragm in motion imparting relation with respect to said first diaphragm, and resilient means mounted within said casing and operatively connected to said movable contact means to yieldably bias the movable contact means in an initial circuit controlling position and whereby the movable contact means is adapted to be moved by said first diaphragm against the opposing force of said spring bias from said initial circuit controlling position with respect to said plurality of terminals into another circuit controlling position with respect thereto when the difference in the dynamic pressure between the nose and side wall of the torpedo reaches a predetermined value.

14. In a differential pressure actuated switch of the character disclosed, the combination of a fluidtight casing having terimnal ports therein, a pair of diaphragms closing said casing and having the outer surfaces thereof respectively in hydraulic communication with a surrounding body of fluid, a plurality of electric terminals respectively mounted in said ports in fluidtight relation with the casing and electrically insulated therefrom, a piston head in abutting relation to the inner surface of a first one of said pair of diaphragms, piston rod mounting means including a retaining element within said casing, a piston rod connected to said piston head and slidably mounted within said mounting means, said piston rod having a shoulder thereon, an electroconducting element slidably carried by said piston rod and engageable by said shoulder and movable thereby as the piston head is moved by said first one of the diaphragms, and resilient means mounted between said electroconducting element and said retaining element to thereby yieldably urge the electroconducting element slidably on the piston and toward a position of engagement with the electric terminals.

References Cited in the file of this patent

FOREIGN PATENTS 29,013     France ________________ Jan. 27, 1935
(1st addition to No. 557,110)